United States Patent
Choi

(10) Patent No.: US 11,663,065 B2
(45) Date of Patent: May 30, 2023

(54) SCSI COMMAND SET FOR ERROR HISTORY LOGGING IN A MEMORY SYSTEM AND OPERATING METHOD THEREOF

(71) Applicant: SK hynix Inc., Gyeonggi-do (KR)

(72) Inventor: Kyu Ho Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 37 days.

(21) Appl. No.: 17/150,698

(22) Filed: Jan. 15, 2021

(65) Prior Publication Data
US 2022/0019499 A1  Jan. 20, 2022

(30) Foreign Application Priority Data
Jul. 17, 2020 (KR) .................. 10-2020-0089028

(51) Int. Cl.
*G06F 11/07* (2006.01)

(52) U.S. Cl.
CPC ........ *G06F 11/0778* (2013.01); *G06F 11/073* (2013.01); *G06F 11/0751* (2013.01); *G06F 11/0775* (2013.01); *G06F 11/0787* (2013.01); *G06F 11/079* (2013.01)

(58) Field of Classification Search
CPC .............. G06F 11/073; G06F 11/0751; G06F 11/0775; G06F 11/0778; G06F 11/0787; G06F 11/3476; G06F 3/0659; G06F 11/0727; G06F 11/079; G06F 3/0614; G06F 3/0616; G06F 3/0617; G06F 3/0619
See application file for complete search history.

(56) References Cited

U.S. PATENT DOCUMENTS

| | | | |
|---|---|---|---|
| 9,690,649 B2 | 6/2017 | Healy et al. | |
| 2003/0051078 A1* | 3/2003 | Yoshitake | G06F 11/3476 714/E11.204 |
| 2009/0083588 A1* | 3/2009 | Yamashita | G06F 11/0793 714/47.1 |
| 2012/0216079 A1* | 8/2012 | Fai | G06F 11/362 714/E11.055 |
| 2013/0219229 A1* | 8/2013 | Sugimoto | G06F 11/3006 714/45 |
| 2016/0103726 A1* | 4/2016 | Benedict | G06F 11/076 714/48 |
| 2017/0255535 A1* | 9/2017 | Freeman | G06F 11/0766 |
| 2018/0357115 A1* | 12/2018 | Miller | G06F 11/0778 |
| 2020/0125437 A1* | 4/2020 | Kataria | G06F 11/0745 |
| 2021/0019218 A1* | 1/2021 | Zhu | G06F 11/0778 |

OTHER PUBLICATIONS

Public Review and Comments Register for the Approval of: INCITS 502-201x, SCSI Primary Commands-5 (SPC-5), Jun. 21, 2019, INCITS, Retrieved from Internet <https://standards.incits.org/apps/group_public/download.php/109877/eb-2019-00306-Public-Review-Register-INCITS-502-201x-Comments-Due-08-19-2019.pdf> (Year: 2019).*

* cited by examiner

*Primary Examiner* — Bryce P Bonzo
*Assistant Examiner* — Albert Li
(74) *Attorney, Agent, or Firm* — IP&T Group LLP

(57) ABSTRACT

A memory system includes: a memory device; and a controller suitable for controlling the memory device and including a buffer memory, wherein the controller performs error history logging into the buffer memory in response to a logging start command from a host, stops the error history logging in response to a logging stop command from the host, and provides the host with the logged error history in response to an output command from the host.

22 Claims, 7 Drawing Sheets

| Bit<br>Byte | 7 | 6 | 5 | 4 | 3 | 2 | 1 | 0 |
|---|---|---|---|---|---|---|---|---|
| 0 | OPERATION CODE (3Ch) ||||||||
| 1 | Reserved ||| MODE |||||
| 2 | BUFFER ID ||||||||
| 3 | (MSB) |||||||  |
| 4 | BUFFER OFFSET ||||||||
| 5 |  ||||||| (LSB) |
| 6 | (MSB) |||||||  |
| 7 | ALLOCATION LENGTH ||||||||
| 8 |  ||||||| (LSB) |
| 9 | CONTROL = 00h ||||||||

| MODE | DESCRIPTION |
|---|---|
| 00h | Not used in UFS |
| 01h | Vendor Specific |
| 02h | Data |
| 03h-1Bh | Not used in UFS |
| 1Ch | Error history |
| 1Dh-1Fh | Reserved |

FIG. 4

| CODE | DESCRIPTION | BUFFER OFFSET |
|---|---|---|
| 00h | Return error history directory[1] | Zero[2] |
| 01h-03h | Not used in UFS | |
| 04h-0Fh | Reserved | |
| 10h-EFh | Return error history from corresponding error history data buffer ID | Zero[2] to Maximum[3] |
| F0h-FDh | Reserved | |
| FEh-FFh | Not used in UFS | |
| NOTE 1 An error history snapshot is not created under this standard.<br>NOTE 2 Zero is 000000h for the READ BUFFER (10) command.<br>NOTE 3 Maximum is FFFFFFh for the READ BUFFER (10) command. | | |

FIG. 5

| | | 500 |
|---|---|---|
| Logging start command | <READ_BUFFER(10), Mode=1Ch, BufferID=04h, BUFFEROFFSET=0x10> |
| Logging stop command | <READ_BUFFER(10), Mode=1Ch, BufferID=05h, BUFFEROFFSET=0x10> |
| Output command | <READ_BUFFER(10), Mode=1Ch, BufferID=F0h, BUFFEROFFSET=0x10> |
| Clear command | <READ_BUFFER(10), Mode=1Ch, BufferID=F1h, BUFFEROFFSET=0x10> |

US 11,663,065 B2

SCSI COMMAND SET FOR ERROR HISTORY LOGGING IN A MEMORY SYSTEM AND OPERATING METHOD THEREOF

CROSS-REFERENCE TO RELATED APPLICATION

This application claims priority under 35 U.S.C. § 119 to Korean Patent Application No, 10-2020-0089028, filed on Jul. 17, 2020, which is incorporated herein by reference in its entirety.

BACKGROUND

1. Field

Various embodiments relate to a memory system including a memory device.

2. Discussion of the Related Art

The computer environment paradigm has been transitioning to ubiquitous computing, which enables computing systems to be used anytime, anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments are directed to a memory system capable of logging an error history in response to a request from a host in order to facilitate error analysis and debugging, and an operating method thereof.

In accordance with an embodiment, a memory system includes: a memory device; and a controller suitable for controlling the memory device and including a buffer memory, wherein the controller performs error history logging into the buffer memory, in response to a logging start command from a host, stops the error history logging in response to a logging stop command from the host, and provides the host with the logged error history in response to an output command from the host.

In accordance with an embodiment, an operating method of a memory system, includes: performing error history logging into a buffer memory, included in the memory system, in response to a logging start command from a host; stopping the error history logging in response to a logging stop command from the host; and providing the host with the logged error history in response to an output command from the host.

In accordance with an embodiment, a system includes: a host; and memory system including a memory device and a controller including a memory, wherein the controller is configured to: receive a first error history command from the host; trigger error history logging in response to the first error history command such that errors that occur in the system are logged in the memory, wherein each error logged in the memory is associated with at least one of command information regarding one or more commands for the memory device and state information of the memory system at the time the corresponding error occurred; receive a second error history command from the host; and provide the host with the error history in response to the second error history command.

BRIEF DESCRIPTION OF THE DRAWINGS

FIG. 2 illustrates a read buffer command included in a small computer system interface (SCSI) command set.

FIG. 3 illustrates various modes of a read buffer command.

FIG. 4 illustrates various actions of an error history command.

FIG. 5 illustrates commands according to an embodiment.

DETAILED DESCRIPTION

Figure 1:
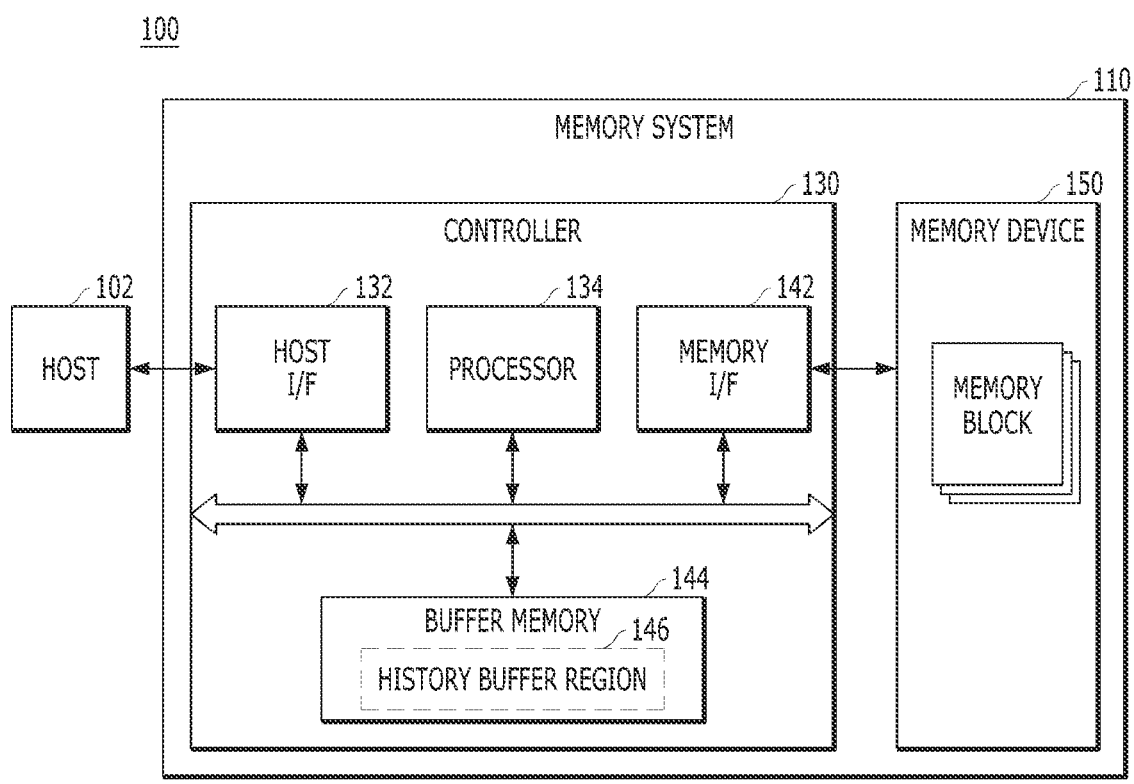
FIG. 1 illustrates a data processing system according to an embodiment.

Various embodiments are described below in more detail with reference to the accompanying drawings. The present disclosure may, however, be embodied in different forms and should not be construed as limited to the embodiments set forth herein. Rather, these embodiments are provided so that this disclosure is thorough and complete, and fully conveys the scope of the present disclosure to those skilled in the art. Throughout the disclosure, like reference numerals refer to like parts throughout the various figures and embodiments of the present disclosure. Also, throughout the specification, reference to "an embodiment," "another embodiment" or the like is not necessarily to only one embodiment, and different references to any such phrase are not necessarily to the same embodiment(s).

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall function and operation of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a universal flash storage (UFS) device.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory I/F 142, and a buffer memory 144, all operatively coupled via an internal bus.

The host I/F 132 may be configured to process a command and data from the host 102. The host I/F 132 may communicate with the host 102 through one or more of various interface protocols such as small computer system interface (SCSI), serial-attached SCSI (SAS).

The host I/F 132 may be driven through firmware referred to as a host interface layer (HIL) in order to exchange data with the host 102.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The processor 134 may control overall operation of the memory system 110. The processor 134 may drive firmware to control overall operation of the memory system 110. The firmware may be referred to as flash translation layer (FTL). Also, the processor 134 may be realized as a microprocessor or a central processing unit (CPU).

The processor 134 may drive the L and perform a foreground operation corresponding to a request received from the host 102. For example, the processor 134 may control a write operation of the memory device 150 in response to a write request from the host 102 and control a read operation of the memory device 150 in response to a read request from the host 102.

Also, the controller 130 may perform a background operation on the memory device 150. Examples of background operations include a garbage collection (GC) operation, a wear-leveling (WL) operation, a map flush operation, and a bad block management operation.

The buffer memory 144 may buffer data received from the host 102, or may buffer data to be provided from the memory system 110 to the host 102. The data to be provided to the host 102 may include an error history. In an embodiment, the buffer memory 144 may include a history buffer region 146, that is, a region of the buffer memory 144 in which an error history may be buffered.

The buffer memory 144 may be implemented as a volatile memory. For example, the buffer memory 144 may be implemented as a static random access memory (SRAM) or a dynamic random access memory (DRAM). The buffer memory 144 may be disposed within or externally to the controller 130. In the illustrated embodiment of FIG. 1, the buffer memory 144 is disposed within the controller 130. In another embodiment, the buffer memory 144 may be implemented as an external volatile memory device having a memory interface for exchanging data between the buffer memory 144 and the controller 130.

The host 102 may obtain data related to an error occurring due to any of various causes during operations of the memory system 110, and may perform debugging based on the data.

For example, when an error is detected in the memory system 110, the processor 134 may log, into the history buffer region 146, an error event including state information of the memory system 110 indicating the time at which the error occurred. In an embodiment, the state information may include information related to a register value of the controller 130 at the time the error occurred. In some implementations, the state information may include another piece of information, e.g., command information. Multiple error events logged in the history buffer region 146 collectively constitute the error history of the memory system 110.

The memory system 110 using an SCSI command set may support an error history command. The host 102 may obtain data related to an error, by providing the error history command to the memory system 110. In particular, the specifications of UFS 3.0 and UFS 3.1 stipulate that the memory system 110 is to support the error history command.

The memory system 110 may provide the logged error history to the host 102 in response to the error history command from the host 102. The host 102 may identify a cause of an error based on the error history, and may perform debugging.

If the processor 134 logs, as an error history, only state information indicating the time at which an error occurred, the host 102 can only identify a cause of the error occurring in the memory system 110 based on the error history, which may not always be accurate or up-to-date.

For example, the state of the memory system 110 may be changed even when the memory system 110 performs an operation in response to one command. Thus, state information logged into the history buffer region 146 may be different depending on the time at which the processor 134 detects an error. Furthermore, internal operation information of the memory system 110 prior to the detection of the error may not be logged into the history buffer region 146. Accordingly, although the host 102 obtains an error history from the memory system 110, it is difficult for the host 102 to generally check an internal operation of the memory system 110 and to perform debugging.

Accordingly, there is a need for a method capable of obtaining, by the host 102, desired information within a desired time window, which is not limited to state information indicating the time at which an error occurred.

For example, it may be desirable that the host 102 be able to obtain command information provided from the controller 130 to the memory device 150, in addition to state information indicating the time at which an error occurred.

According to an embodiment, the host 102 may control the processor 134 to start command information logging into the history buffer region 146 of the buffer memory 144 by providing a first command to the memory system 110, and may control the processor 134 to stop the command information logging by providing a second command to the memory system 110. The processor 134 may log command information within a time window determined by the receipt of first and second commands from the host 102. The host 102 may obtain the command information logged into the history buffer region 146 by providing a third command to the memory system 110.

The command information may be an error history that is different from that of the state information. That is, in an embodiment, the error history may include state type information error history and command type information error history.

The first to third commands may be implemented based on the SCSI command set. If the first to third commands are implemented based on the SCSI command set, the complexity of such implementation of the controller 130 can be reduced compared to a case where the first to third commands are implemented as vendor-specific commands.

Hereinafter, the SCSI command set is described with reference to FIGS. 2 to 4. Commands implemented based on the SCSI command set according to some embodiments are described with reference to FIG. 5.

FIG. 2 illustrates a first table 200 that describes a read buffer command included in the SCSI command set.

Referring to FIG. 2, the first table 200 illustrates a command descriptor block (CDB) of a read buffer command. The read buffer command may be configured to have 10-byte data, and may include data such as an operation code "3ch", a mode, a buffer identifier (ID), a buffer offset, an allocation length, and a control code "00h."

The memory system 110 may provide a buffer of the host 102 with a set number of data bytes from a set offset within the buffer memory 144, in response to a read buffer command from the host 102.

The host 102 may designate a data mode or an error history mode of the memory system 110, by setting a mode value of the read buffer command provided to the memory system 110.

FIG. 3 illustrates a second table 300 that describes various modes of the read buffer command.

Referring to FIG. 3, the second table 300 indicates mode values of the read buffer command. Mode values "00h" and "03h-1Bh" may not be used in a UFS memory system. A mode value "01h" may indicate a vendor-specific mode. A mode value "02h" may designate a data mode. A mode value "1Ch" may indicate an error history mode. "1Dh-1Fh" may be reserved mode values that are currently not used to designate any mode(s).

A read buffer command having a mode value set as "1Ch" may be denoted as an error history command.

FIG. 4 illustrates a third table 400 that describes various actions of an error history command.

Referring to FIG. 4, the host 102 may specify an action to be performed by the memory system 110 and data to be returned by the memory system 110, by setting a value of the buffer ID of an error history command in FIG. 2.

For example, a buffer ID value "00h" may indicate that an error history directory buffered in the buffer memory 144 should to be returned. The error history directory may include a plurality of directory entries. Each of the directory entries may include an error history. "10h-EFh" may indicate that only the error history of a selected directory entry in the error history directory should be returned.

Buffer ID values "01h-03h" and "FEh-FFh" may not be used in a UFS memory system. Buffer ID values "04h-0Fh" and "F0h-FDh" may be values reserved with no action currently designated thereby. A broken line illustrated in FIG. 4 indicates a reserved buffer ID value.

According to an embodiment, the memory system 110 may support a logging start command that controls the processor 134 to start command information logging into the buffer memory 144 using reserved buffer ID values of an error history command, a logging stop command that controls the processor 134 to stop the command information logging, and an output command that controls the processor 134 to output command information logged into the buffer memory 144.

FIG. 5 illustrates a fourth table 500 that describes commands according to an embodiment.

In some embodiments, as shown in FIG. 5, the command descriptors of the logging start command, the logging stop command and the output command may be supported by the memory system 110. The memory system 110 may further support a clear command. FIG. 5 also illustrates the command descriptor of the clear command.

In accordance with the illustrated example of FIG. 5, the host 102 may provide the memory system 110 with an error history command in which a buffer ID is set to "04h" and a buffer offset is set to "0x10", as the logging start command. "READ_BUFFER(10), Mode=1Ch" illustrated in FIG. 5 indicates an error history command, as described with reference to FIGS. 2 and 3. The buffer offset "0x10" may designate the history buffer region 146. In some implementations, a value of the buffer offset may be different.

The processor 134 may log command information into the history buffer region 146 in response to the logging start command. For example, after receiving the logging start command, the processor 134 may log commands generated by the processor 134 and provided to the memory device 150 to create a history of commands.

The host 102 may provide the memory system 110 with an error history command in which a buffer ID is set to "05h" and a buffer offset is set to "0x10", as the logging stop command. The processor 134 may stop the command information logging in response to the logging stop command.

The host 102, on its initiative, may determine a time window, in which command information is to be logged, by providing the logging start command and the logging stop command. Further, and the host 102 may obtain the command information logged in the time window, by providing the output command.

The host 102 may provide the memory system 110 with an error history command in which a buffer ID is set to "F0h" and a buffer offset is set to "0x10", as the output command. The processor 134 may provide the host 102 with command information, buffered in the history buffer region 146, in response to the output command.

The host 102 may provide the memory system 110 with an error history command in which a buffer ID is set to "F1h" and a buffer offset is set to "0x10", as the clear command. The processor 134 may clear command information, buffered in the history buffer region 146, in response to the clear command.

By way of example, the fourth table 500 illustrates the buffer IDs of the logging start command, the logging stop command, the output command, and the clear command as "04h", "05h", "F0h", and "F1h", respectively, but the present invention is not limited to those specifics. For example, any or all of the buffer IDs of the logging start command, the logging stop command, the output command, and the clear command may be designated by reserved buffer ID value(s).

Figure 6:
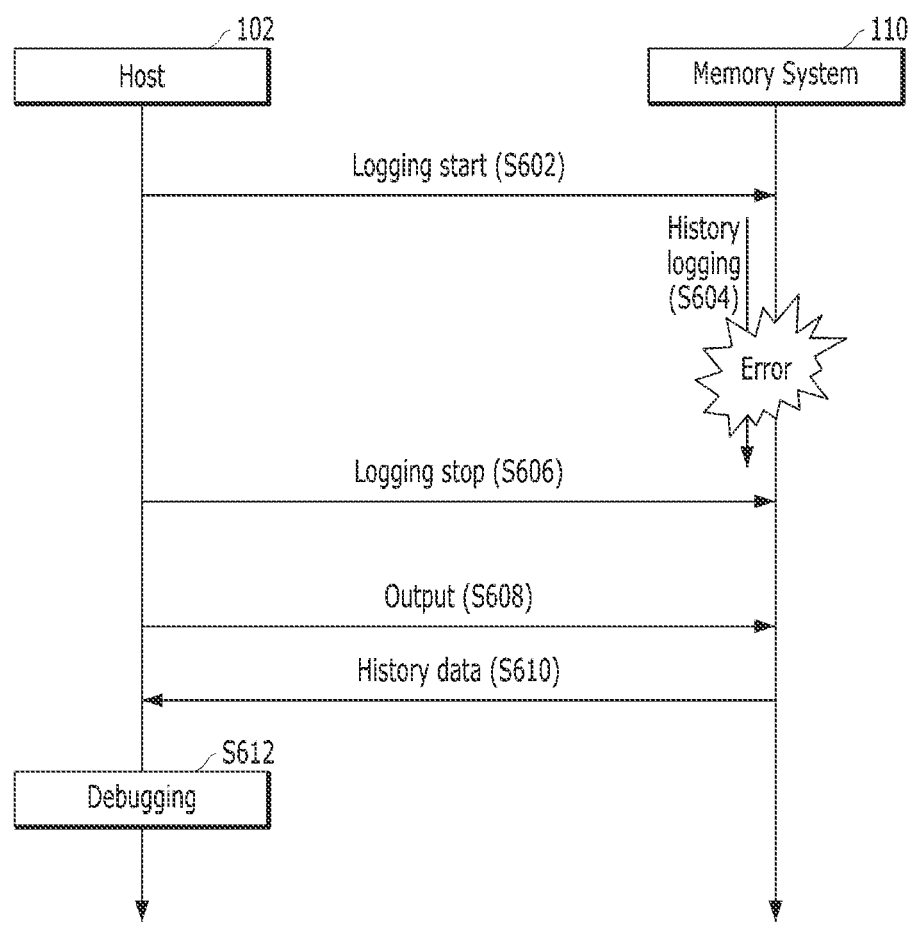
FIG. 6 illustrates transactions between a host and a memory system according to an embodiment.

FIG. 6 illustrates transactions between the host 102 and the memory system 110 according to an embodiment.

Referring to FIG. 6, at operation S602, the host 102 may provide a logging start command to the memory system 110.

For example, when an error is detected in the memory system 110 during the test of the memory system 110, the host 102 may confirm a cause of the occurrence of the error by reproducing the occurrence of the error, and may perform debugging. In order to obtain command information before and after the occurrence of the error, the host 102 may provide the logging start command before the occurrence of the error.

At operation S604, the memory system 110 may log all commands (or pieces of command information) into the history buffer region 146 until a logging stop command is received from the host 102.

For example, the memory system 110 may store, in the history buffer region 146, command information of a command each time the controller 130 provides a command to the memory device 150.

While the memory system 110 logs the command information, an error may be detected in the memory system 110. In some embodiments, the memory system 110 may also log state information indicating the time at which an error occurred, separately from the command information logged at operation S604.

The command information and the state information may be included in an error history directory stored in the history buffer region 146. An error history directory according to an embodiment is described below with reference to FIG. 7.

At operation S606, the host 102 may provide a logging stop command to the memory system 110 in order to stop the command information logging. The memory system 110 may stop the command information logging in response to the logging stop command.

At operation S608, the host 102 may provide an output command to the memory system 110 in order to obtain the command information (command history) logged at operation S604.

At operation S610, the memory system 110 may provide the host 102 with the command history (history data), buffered in the history buffer region 146, in response to the output command.

At operation S612, the host 102 may perform debugging based on the command information received from the memory system 110.

Figure 7:
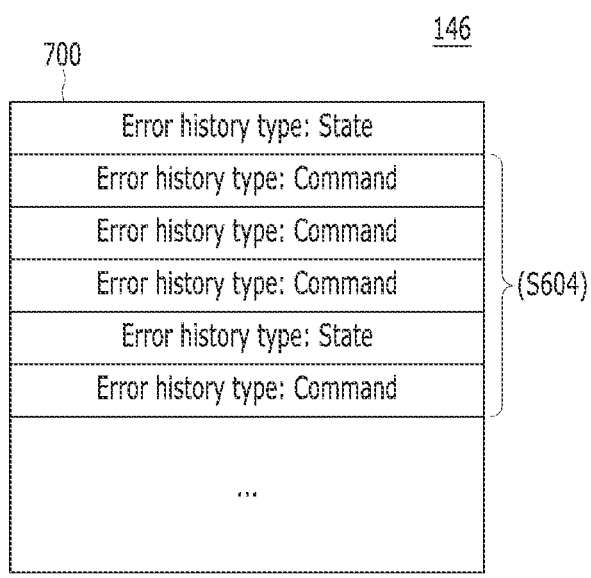
FIG. 7 illustrates an error history directory which may be stored in a history buffer region according to an embodiment.

FIG. 7 is a diagram illustrating an error history directory 700 which may be stored in the history buffer region 146 according to some embodiments.

Referring to FIG. 7, the error history directory 700 may include a plurality of directory entries. Although not shown in FIG. 7, the error history directory 700 may also include a header.

Each of the plurality of directory entries may include an error history. In an embodiment, the error history may include any one of state information and command information. In the illustrated example of FIG. 7, an error history type for each directory entry may depend on whether each error history indicates state information or command information.

When a set condition is satisfied, the processor 134 may perform error history logging. The processor 134 may add an error event to the error history directory 700 as error events occur.

Operation S604 in FIG. 7 illustrates the operation of providing, by the host 102, a logging start command and logging, by the processor 134, command information in a time window before a logging stop command is provided, as described with reference to FIG. 6.

In the time window, the processor 134 may add an error event including associated command information to an error history directory 700 whenever a command is provided to the memory device 150. Each error event added is associated with state and/or command information.

When an error occurs even in the time window, the processor 134 may add, to the error history directory 700, state information indicating the time at which the error occurred.

According to an embodiment, the memory system 110 may support a logging start command, a logging stop command, and an output command so that the host 102 may obtain desired information in a desired time window, which information is not limited to state information indicating the time at which an error occurred. The memory system 110 may support the logging start command, the logging stop command, and the output command using a reserved buffer ID value of an error history command. By way of example, the desired information may be command information provided from the controller 130 to the memory device 150, but the present invention is not limited thereto.

The host 102 may obtain command information in a desired time window using the logging start command, the logging stop command, and the output command. The host 102 may obtain command information before and after the occurrence of an error, may generally check an internal operation before and after the occurrence of the error, may easily analyze a cause of an error, and may perform debugging.

The present disclosure may provide a memory system capable of logging error events to generate an error history in response to a request from a host in order to facilitate error analysis and debugging, and an operating method thereof.

Although various embodiments have been illustrated and described, it will be apparent to those skilled in the art in view of the present disclosure that various changes and modifications may be made without departing from the spirit and scope of the disclosure as defined in the following claims.

What is claimed is:

1. A memory system comprising:
a memory device; and
a controller suitable for controlling the memory device and including a buffer memory,
wherein the controller performs error history logging into the buffer memory in response to a logging start command from a host, stops the error history logging in response to a logging stop command from the host, and provides the host with the logged error history in response to an output command from the host,
wherein the logging start command, the logging stop command, and the output command are included in an error history small computer system interface (SCSI) command set, and
wherein error history information logged by the controller in response to the logging start command from the host is logged at a time period determined by the host and includes command information different from error history information logged by the controller in response to an error history SCSI command of the SCSI command set which does not include the logging start command at a time at which a reproduced error occurred.

2. The memory system of claim 1, wherein the controller clears the error history from the buffer memory in response to a clear command from the host.

3. The memory system of claim 2, wherein
the clear command is further included in the error history SCSI command set, and
wherein each of the logging start command, the logging stop command, the output command, and the clear command is designated based on a value of a buffer identifier (ID) of the error history SCSI command set.

4. The memory system of claim 3, wherein the error history SCSI command set includes a read buffer command which designates a specific mode of operation of the memory system.

5. The memory system of claim 3, wherein:
each of the logging start command, the logging stop command, the output command, and the clear command further comprises a buffer offset and
the buffer offset designates a location where an error history directory is stored.

6. The memory system of claim 1, wherein the controller performs the error history logging by storing command information of a command in the buffer memory each time the controller provides the command to the memory device.

7. The memory system of claim 6, wherein the controller further stores, in the buffer memory, state information indicating the time at which the error occurred in the memory system.

8. The memory system of claim 7, wherein the state information comprises information related to a register value of the controller at the time at which the error occurred.

9. The memory system of claim 7, wherein:
the buffer memory stores an error history directory comprising a plurality of directory entries, and
each of the plurality of directory entries comprises one of the command information and the state information.

10. The memory system of claim 1, wherein the error history information logged by the controller in response to the logging start command includes state information, command information, internal operation information, register information, and any combination thereof.

11. An operating method of a memory system, comprising:
performing error history logging into a buffer memory, included in the memory system, in response to a logging start command from a host;
stopping the error history logging in response to a logging stop command from the host; and
providing the host with the logged error history in response to an output command from the host,
wherein the logging start command, the logging stop command, and the output command are included in an error history small computer system interface (SCSI) command set, and
wherein error history information logged by a controller of the memory system in response to the logging start command from the host is logged at a time period determined by the host and includes command information different from error history information logged in response to an error history SCSI command of the SCSI command set which does not include the logging start command at a time at which a reproduced error occurred in.

12. The operating method of claim 11, further comprising clearing the error history from the buffer memory in response to a clear command from the host.

13. The operating method of claim 12, wherein
the clear command is included in the error history SCSI command set, and
each of the logging start command, the logging stop command, the output command, and the clear command is designated based on a value of a buffer identifier (ID) of the error history SCSI command set.

14. The operating method of claim 13, wherein the error history SCSI command set includes a read buffer command which designates a specific mode of operation of the memory system.

15. The operating method of claim 13, wherein:
each of the logging start command, the logging stop command, the output command, and the clear command further comprises a value of a buffer offset, and the value of the buffer offset designates a location where an error history directory is stored.

16. The operating method of claim 11, wherein the performing of the error history logging comprises storing, in the buffer memory, command information of a command each time the controller of the memory system provides the command to a memory device of the memory system.

17. The operating method of claim 16, further comprising storing, in the buffer memory, state information indicating the time at which the error occurred in the memory system.

18. The operating method of claim 17, wherein the state information comprises information related to a register value of the controller at the time at which the error occurred.

19. The operating method of claim 17, wherein:
the buffer memory stores an error history directory comprising a plurality of directory entries, and
each of the plurality of directory entries comprises one of the command information and the state information.

20. The operating method of claim 11, wherein the error history information logged by the controller in response to the logging start command includes state information, command information, internal operation information, register information, and any combination thereof.

21. A system comprising:
a host; and
a memory system including a memory device and a controller including a memory,
wherein the controller is configured to:
receive a first error history command from the host;
trigger error history logging in response to the first error history command such that errors that occur in the system are logged in the memory, wherein each error logged in the memory is associated with at least one of command information regarding one or more commands for the memory device and state information of the memory system at a time the corresponding error occurred;
receive a second error history command from the host; and
provide the host with the error history in response to the second error history command,
wherein the first error history command and the second error history command are included in an error history small computer system interface (SCSI) command set, and wherein error history information logged by the controller in response to the first error history command from the host is logged at a time period determined by the host and includes command information different from error history information logged by the controller in response to an error history SCSI command of the SCSI command set which does not include the first error history command at a time at which a reproduced error occurred.

22. The system of claim 21, wherein the error history information logged by the controller in response to the first error history command includes state information, command information, internal operation information, register information, and any combination thereof.

* * * * *